Nov. 15, 1955  D. A. ELLIOTT  2,723,524
CUTTER BAR FOR LAWN MOWER
Filed March 19, 1952  2 Sheets-Sheet 1
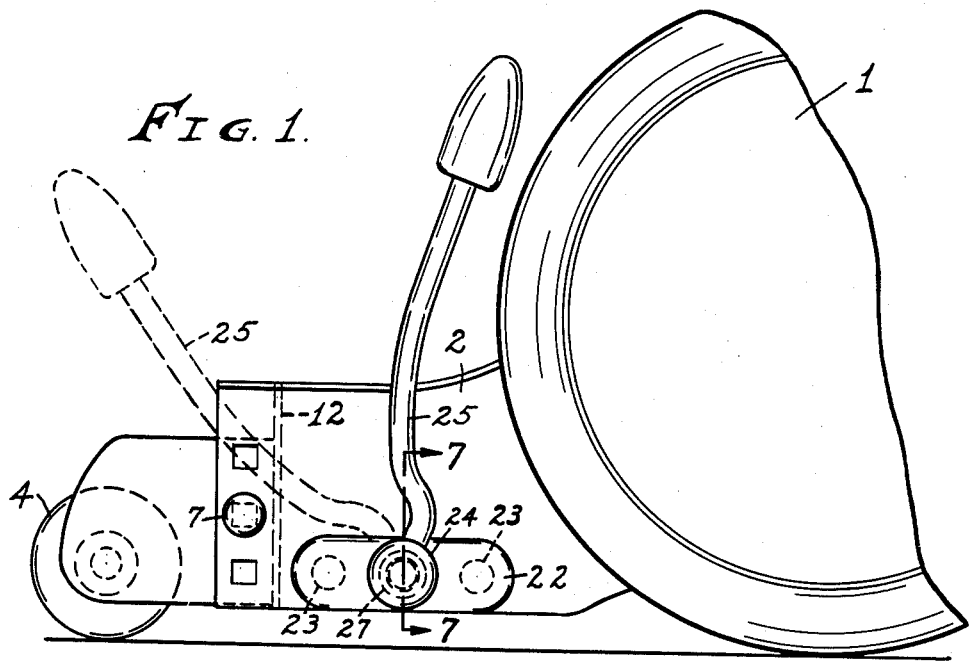
Fig. 1.
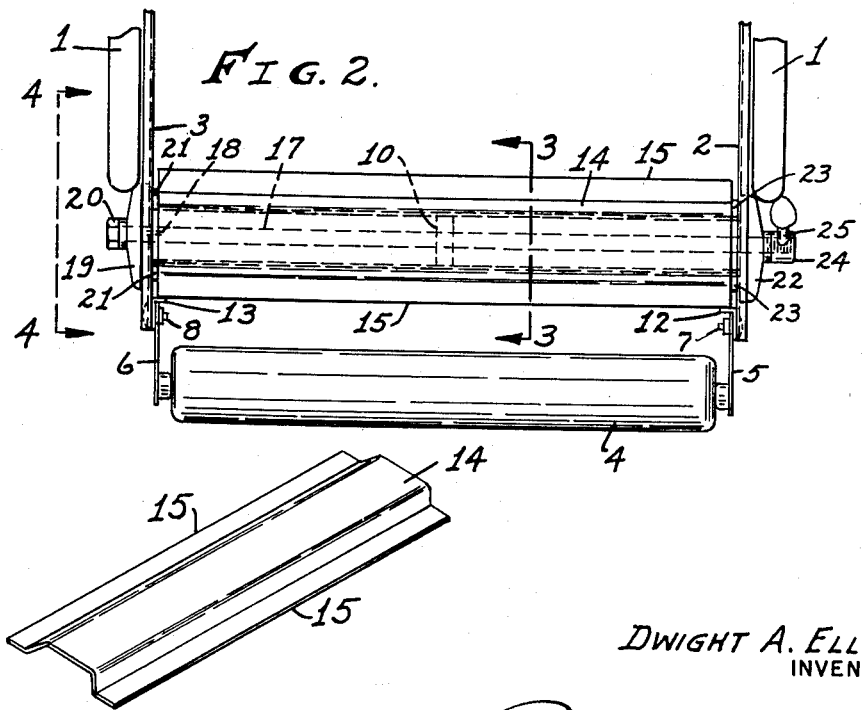
Fig. 2.
Fig. 12.
DWIGHT A. ELLIOTT,
INVENTOR.
BY Donald E. Windle.
ATTORNEY.

Nov. 15, 1955    D. A. ELLIOTT    2,723,524
CUTTER BAR FOR LAWN MOWER
Filed March 19, 1952    2 Sheets-Sheet 2
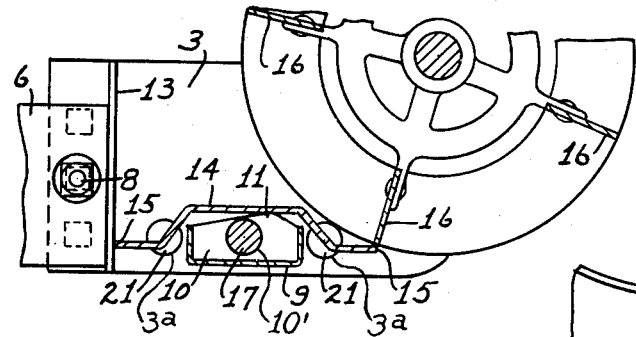
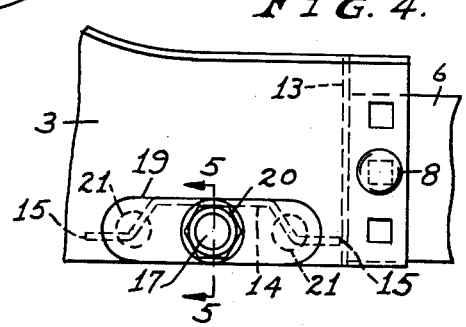
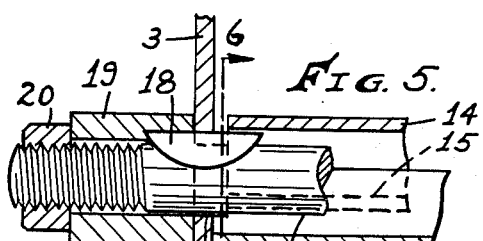
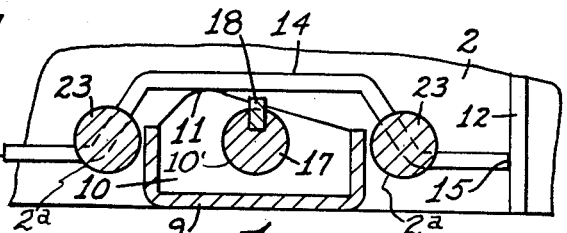
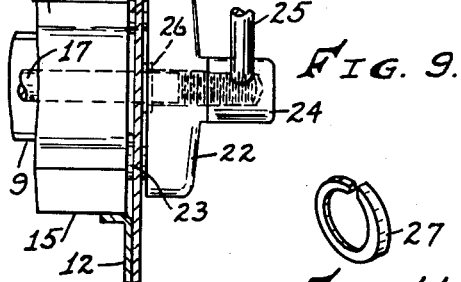
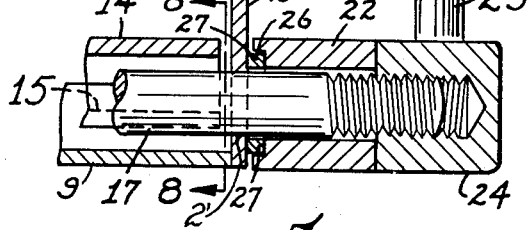
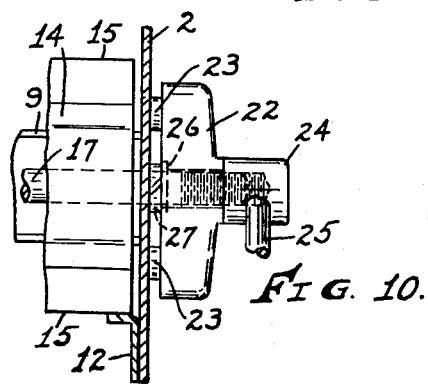
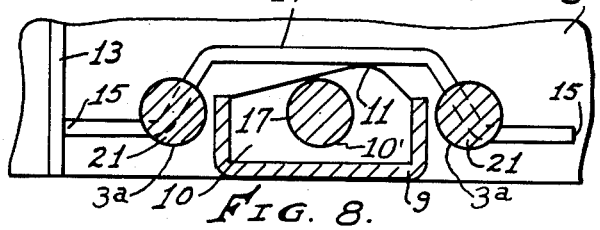
DWIGHT A. ELLIOTT,
INVENTOR.
BY Donald E. Windle.
ATTORNEY.

United States Patent Office 2,723,524
Patented Nov. 15, 1955

2,723,524

CUTTER BAR FOR LAWN MOWER

Dwight A. Elliott, Richmond, Ind.

Application March 19, 1952, Serial No. 277,488

9 Claims. (Cl. 56—289)

The present invention pertains particularly to cutting bars used in connection with lawn mowers utilizing a revolving reel having blades and with the same revolving into shearing contact with the adjacent edge of a cutter bar. I am aware that this type of lawn mower is old in the art. However, the conventional types of cutter bars present certain problems in maintaining the same in shearing adjustmnet with relation to the blades carried by the revolving reel.

The principal object of the present invention is the provision of a cutter bar which is devoid of mechanical adjusting means.

A second object is the provision of a lawn mower cutter bar which is formed of a single piece of metal, and which is imperforate.

Another object is the provision of a fulcrum member supporting the cutter bar and which permits the cutter bar to be easily aligned to the path of the revolving reel blades.

A further object is the provision of means clamping the cutter bar in its adjusted shearing position with said clamping means providing for quick adjustment or removal of the cutter bar.

A still further object is the provision of a cutter bar having a double shearing edge and which is imperforate, and which is of unitary construction.

Further objects and particular advantages of the invention will become more apparent in the course of the following description, with reference being made to the accompanying drawings forming a part hereof, in which:

Figure 1 is a partial left end elevation of a lawn mower incorporating the features of the invention.

Figure 2 is a partial plan of the lawn mower showing the cutter bar in place between the frame members of the mower.

Figure 3 is a detail section through the cutter bar and the associated parts, taken on line 3—3 of Figure 2, and also showing the relation of the revolvable reel to the cutter bar.

Figure 4 is a partial detail elevation of the left end of the mower, as taken from line 4—4 of Figure 2.

Figure 5 is an enlarged detail section, taken on line 5—5 of Figure 4, and showing the left end of the cutter bar securing means.

Figure 6 is a detail section taken on line 6—6 of Figure 5.

Figure 7 is an enlarged detail section through the right end of the cutter bar, as taken on line 7—7 of Figure 1, and showing the clamping means therefor.

Figure 8 is a detail section through Figure 7 on line 8—8.

Figure 9 is a detail plan view of the clamping means and showing the same in clamped relation with the cutter bar.

Figure 10 is a plan view similar to that shown in Figure 9, but with the clamping means being shown in released relation.

Figure 11 is an isometric view of the throw-out spring used in releasing the cutter bar from its clamped position.

Figure 12 is an isometric view of the cutter bar.

Like characters of reference denote like parts throughout the several views.

In order that the construction, the advantages, and the novel features of the invention may be more readily understood and appreciated, I will take up a detailed description thereof in which the same will be more fully set forth.

Referring now to the drawings in detail, numerals 1—1 designate the wheels of the lawn mower. 2 designates the right side of the mower frame, with 3 designating the left side of the mower frame. The roller 4 is removably secured to the rear ends of the frame members 2 and 3 by means of brackets 5 and 6 respectively secured to the frame members by bolts 7 and 8.

The rear end portions of side members 2 and 3 are maintained in rigid spaced relation by means of upwardly-opening channel member 9 which is secured between the side members by suitable means, preferably by welding. A cam 10 is secured in channel 9 between the ends thereof and is preferably located at a point substantially midway between the ends of the channel. An aperture is formed through the cam 10 for the reception of a rod member as will be more fully set forth hereinafter. The cam member has a cam surface 11 formed thereon and with the same being located slightly forward of the center of the cam member.

Angle members 12 and 13 are rigidly secured to the rear end portions of side members 2 and 3 respectively, and positioned vertically thereon.

Cutter bar member 14, having shearing edges 15—15, is adapted to rest on cam surface 11 with either of its edges being in shearing relation with reel blades 16. Cutter bar member 14 is imperforate and is substantially channel-shaped with the shearing edges 15—15 extending outwardly therefrom, as more clearly shown in Figure 12. Cam surface 11 provides a fulcrum on which the cutter bar rests and is adapted to tilt to conform with the alignment of the reel blades, as will be hereinafter set forth.

Each of the side members 2 and 3 have apertures 2' and 3' respectively formed therethrough with the apertures, together with the aperture 10' formed through the cam member being in alignment, and are adapted to receive locking rod 17 which extends longitudinally of channel 9 with the ends thereof extending through the side members 2 and 3. Locking rod 17 has threads formed on each end thereof. The left end of rod 17 is provided with a keyway for the reception of key member 18 which is located therein to register with a suitable slot formed in side member 3, as more clearly shown in Figures 5 and 6. Key 18 permits longitudinal movement of rod 17 through the side member 3 without permitting the rotation of the rod.

A clamping housing member 19 is located on the left side of the mower and is adapted to fit onto the left end of locking rod 17 with a nut 20 being threaded on the left end of the rod against housing 19. Housing 19 has two lugs 21—21 projecting inwardly therefrom and extending inwardly through respective apertures 3ª formed through side member 3, and with the lugs 21—21 being in normal engaging contact with the left end of the cutter bar.

A second clamping housing 22 is located on the right side of the mower on the right end of rod 17. A pair of inwardly-projecting lugs 23—23 are formed on housing 22 and extend through respective apertures 2ª formed through side member 2, and with the inner ends of lugs 23—23 being capable of contacting the right end of the cutter bar. A threaded hub 24 is threaded onto the right end of rod 17 and is adapted to be tightened or loosened with relation to housing 22 by means of a handle or lever 25.

A recess 26 is formed in the inner face of housing 22 concentric with rod 17 and provides for the reception of throw-out spring 27 which is housed therein. It will be noted, by referring to Figure 11, that throw-out spring 27 has the form of a lock washer, with one side thereof being adapted to bear against the outer surface of side member 2 adjacent thereto, and with the other side thereof being adapted to bear against housing 22 in the recess 26. Rod 17 extends through washer 27.

*Operation*

In the operation of the cutter bar, with lever 25 being in the position shown by broken lines in Figure 1, the cutter bar is placed between frame side members 2 and 3 and, with the same resting on cam surface 11, the reel is revolved slowly while the cutter bar is manually urged into contact with the reel blades 16, whereupon lever 25 is brought to the clamping position, as shown by solid lines in Figure 1. Clamping motion of lever 25 forces housing 22 toward side member 2 with the lugs 23—23 thereof projecting inwardly through the side member and into clamping contact with the respective end of cutter bar 14, as indicated in Figure 9. The clamping pressure of lugs 23—23 against the end of the cutter bar forces the opposite end of the cutter bar into contact with lugs 21—21, and with further forward movement of lever 25 causing the cutter bar to be rigidly clamped between lugs 21—21 of the left side and lugs 23—23 of the right side, and with the cutter bar resting on the fulcrum 11 substantially midway between the ends.

In placing the cutter bar in the mower, vertically-positioned angles 12 and 13 serve as guides in establishing the cutter bar in the mower, with the rear edge of the cutter bar engaging the angles.

When it is desired to remove the cutter bar, lever 25 is moved rearwardly to the approximate position shown by broken lines in Figure 1, after which the cutter bar is free to be removed from the mower. The releasing action of lever 25 provides the same result as loosening a nut in releasing pressure against housing 22, and with spring 27 forcing housing 22 outwardly with the releasing action of lever 25, and with the same action withdrawing lugs 23—23 from their contact with the adjacent end of the cutter bar.

Nut 20 is provided on the left end of rod 17 for the purpose of adjusting the longitudinal position of rod 17 to compensate for any wear between members 24 and 22, and also to provide a means permitting a positive clamping when the lever 25 is brought to the approximate position as shown in solid lines in Figure 1.

It is of particular interest to note that the cutter bar is formed of a single piece of material and is imperforate, and is provided with two cutting or shearing edges. Should the mower engage an object which would damage one edge of the cutter bar, the operator may release the cutter bar by movement of lever 25 rearwardly and remove the cutter bar. The cutter bar can then be turned with the undamaged edge in shearing relation with the reel blades, after which the same is clamped in the mower by the forward movement of lever 25. The cutter bar is capable of removal and replacement without the use of tools.

The fulcrum member provides the necessary means of establishing the correct alignment of the respective edge 15 of the cutter bar with relation to the reel blades before the cutter bar is clamped in rigid relation.

In conventional mowers, there is usually an adjusting screw provided at each end of the cutter bar to adjust the alignment of the same with relation to the reel blades. It is also brought out that the conventional cutter bars are provided of a relatively heavy casting having a machined surface together with a blade member which is secured thereto by means of screws, rivets, or bolts, and providing but a single shearing edge.

I desire that it be understood that, while the preferable form of the invention is shown and described, I am not to be limited to the specific form and arrangement of the parts herein shown and described, but that changes may be made therein, insofar as the changes therein may fall within the scope of the appended claims.

Having now shown and described the invention, what I claim is:

1. In a lawn mower having side members, a rigid imperforate cutter bar located between the side members and in shearing relation with the reel blades of the lawn mower, with the cutter bar resting on a fulcrum member located rearwardly of the reel blades on a cross member extending between the side members of the lawn mower, adjustable clamping members extending through apertures formed in the side members of the lawn mower, and with the clamping members engaging the ends of the cutter bar and rigidly clamping the same in shearing relation with the reel blades.

2. In a lawn mower having side members and with a revolvable reel located therein with blades carried by the reel, a rigid, imperforate cutter bar, said cutter bar being positioned rearwardly of the revolvable reel between the side members and in shearing relation with the reel blades, said cutter bar being positioned on a fulcrum member located on a cross member extending between the side members, adjustable clamping members extending through the side members providing means clamping the cutter bar in rigid shearing relation with the reel blades, and with the cutter bar being of substantial channel shape with the shearing edges formed thereon extending outwardly therefrom.

3. In a lawn mower having side members, a rigid, imperforate, double-edged, channel-shaped cutter bar positioned between the side members, a fulcrum member located on a cross member between the side members with the fulcrum supporting the cutter bar, and means extending through the side members and engaging the ends of the cutter bar and clamping the same in rigid condition.

4. In a lawn mower construction, a pair of spaced-apart side members, a vertically-disposed angular guide member rigidly secured to the inner face of each of the side members near the rear ends thereof, a rigid, imperforate cutter bar having forward and rear edges positioned between the side members with the rear edge of the cutter bar being in engagement with the vertically-disposed angular guide members, a fulcrum member located on a cross member extending between the side members and supporting the cutter bar, with clamping means extending inwardly through the side members and engaging the ends of the cutter bar and providing means rigidly clamping the cutter bar in the mower, and with the cutter bar being of channel shape with the forward and rear edges thereof extending outwardly therefrom.

5. In a lawn mower construction, a rigid cutter bar located between the side members of the lawn mower, a cross member extending between the side members of the lawn mower and having a fulcrum member located thereon and providing a means supporting the cutter bar near the central portion thereof, lugs extending through each of the side members and engaging the ends of the cutter bar with adjustable means providing clamping movement of the lugs with relation to the ends of the cutter bar, and with the cutter bar being devoid of apertures formed therethrough.

6. In a lawn mower having rearwardly-extending side members, a fulcrum member located in a channel cross member extending between the side members, a rigid cutter bar resting on and supported by the fulcrum member, clamping means extending through the side members and in clamping relation with the ends of the cutter bar, said clamping members being composed of one pair of normally fixed lugs projecting inwardly through one of the side members and in contacting relation with the respective end of the cutter bar, a second pair of lugs being adjustable and projecting inwardly through the opposed side member and adapted to engage the opposite end of the cutter bar, with adjustable means providing inward and outward movement to the second pair of lugs with relation to the cutter bar, with inward movement of the second pair of lugs providing a clamping condition of the cutter bar between both pairs of lugs, and with the cutter bar being imperforate.

7. In a lawn mower construction, a pair of spaced-apart side members, a fulcrum member located between the side members, an imperforate cutter bar resting on the fulcrum member, clamping means capable of rigidly securing the cutter bar between the side members, said clamping means being composed of a clamping rod having threads formed on each end thereof with the rod extending through the fulcrum member and each of the side members, a housing positioned on one end of the clamping rod and having a pair of lugs formed thereon extending through the respective side member and in engagement with the adjacent end of the cutter bar, a nut threaded on the end of the clamping rod against the housing member, a second housing member having a pair of inwardly-extending lugs formed thereon with the lugs extending inwardly through the adjacent side member and being capable of engaging the adjacent end of the cutter bar and with the second housing member being positioned on the clamping rod, a hub member threaded on the second threaded end of the clamping rod, a lever secured to the hub member providing means by which the hub member is turned on the rod against the outer surface of the second housing member, with the hub member providing means forcing the second pair of lugs into clamping contact with the end of the cutter bar, a spring positioned in the second housing forcing the housing away from the side member upon the loosening movement of the hub member on the clamping rod, with the movement of the second housing away from the adjacent side member releasing the cutter bar from its clamped position between the pairs of lugs, and means providing longitudinal movement of the clamping rod and also restricting rotation thereof.

8. In a lawn mower, an imperforate, a rigid, one piece cutter bar, said cutter bar being of channel shape and having a shearing edge formed along each longitudinal side thereof and extending outwardly therefrom, and with means extending through side plates of the lawn mower engaging the ends of the cutter bar and clamping the same in fixed relation in the lawn mower.

9. In a lawn mower, an imperforate, rigid, one piece cutter bar, said cutter bar being substantially channel-shaped, with the longitudinal edges thereof being turned outwardly and forming shearing edges thereon, with clamping lugs extending through side plates of the lawn mower engaging the ends of the cutter bar, and with the clamping lugs providing means securing the cutter bar in rigid relation with the lawn mower.

References Cited in the file of this patent
UNITED STATES PATENTS

| | | |
|---|---|---|
| 651,902 | Townsend | June 19, 1900 |
| 905,591 | Rowe | Dec. 1, 1908 |
| 1,903,183 | Jessup | Mar. 28, 1933 |
| 2,236,612 | Stoner | Apr. 1, 1941 |
| 2,490,169 | Swahnberg | Dec. 6, 1949 |
| 2,490,170 | Swahnberg | Dec. 6, 1949 |